(12) United States Patent
Bergström et al.

(10) Patent No.: US 8,872,098 B2
(45) Date of Patent: Oct. 28, 2014

(54) SCANNING FTIR SYSTEMS FOR TOUCH DETECTION

(75) Inventors: Håkan Bergström, Torna Hällestad (SE); Thomas Craven-Bartle, Södra Sandby (SE)

(73) Assignee: Flatfrog Laboratories AB, Lund (SE)

( * ) Notice: Subject to any disclaimer, the term of this patent is extended or adjusted under 35 U.S.C. 154(b) by 372 days.

(21) Appl. No.: 13/325,902

(22) Filed: Dec. 14, 2011

(65) Prior Publication Data

US 2012/0153134 A1    Jun. 21, 2012

Related U.S. Application Data

(60) Provisional application No. 61/423,791, filed on Dec. 16, 2010.

(30) Foreign Application Priority Data

Dec. 16, 2010 (SE) ...................... 1051335

(51) Int. Cl.
*G06M 7/00* (2006.01)
*G06F 3/042* (2006.01)

(52) U.S. Cl.
CPC .... *G06F 3/0423* (2013.01); *G06F 2203/04109* (2013.01); *G06F 3/042* (2013.01)
USPC .......................... 250/221; 345/175

(58) Field of Classification Search
CPC ................. G06F 3/042; G06F 3/0423; G06F 2203/04109
USPC ............................ 250/221; 345/173, 175, 176
See application file for complete search history.

(56) References Cited

U.S. PATENT DOCUMENTS 3,673,327 A * 6/1972 Johnson et al. ............ 178/18.04
4,737,626 A   4/1988 Hasegawa
(Continued)

FOREIGN PATENT DOCUMENTS

WO   WO 2005/057399   6/2005
WO   WO 2009/048365   4/2009
(Continued)

OTHER PUBLICATIONS

European Search Report dated Mar. 29, 2012 issued in European Application No. 11193199.4.
(Continued)

*Primary Examiner* — Tanh Luu
(74) *Attorney, Agent, or Firm* — Harness, Dickey & Pierce, P.L.C.

(57) ABSTRACT

A touch-sensitive apparatus operates by FTIR (Frustrated Total Internal Reflection) to detect touches on a surface of a light transmissive panel. An illumination arrangement is controlled to propagate light by internal reflection from an elongated incoupling site on the panel to an elongated outcoupling site on the panel, and a detection arrangement is controlled to detect light reaching the outcoupling site. The illumination arrangement is controlled to sweep a first set of individual beams of light along different subsets of the incoupling site to generate a full beam sweep along the incoupling site. Thereby, the individual beams are be controlled to generate a "sub-sweep" of the incoupling site, which enables a compact design of the illumination arrangement and/or use of comparatively simple sweep generating devices and/or identical re-direction components in the illumination arrangement.

20 Claims, 6 Drawing Sheets

(56) References Cited

U.S. PATENT DOCUMENTS

| | | | |
|---|---|---|---|
| 4,837,430 | A | 6/1989 | Hasegawa |
| 6,972,753 | B1 | 12/2005 | Kimura et al. |
| 7,432,893 | B2 | 10/2008 | Ma et al. |
| 7,924,272 | B2 | 4/2011 | Boer et al. |
| 8,077,147 | B2 | 12/2011 | Krah et al. |
| 8,093,545 | B2 | 1/2012 | Leong et al. |
| 2001/0005308 | A1 | 6/2001 | Oishi et al. |
| 2004/0252091 | A1 | 12/2004 | Ma et al. |
| 2005/0057903 | A1 | 3/2005 | Choi |
| 2006/0114237 | A1 | 6/2006 | Crockett et al. |
| 2006/0158437 | A1 | 7/2006 | Blythe |
| 2007/0075648 | A1 | 4/2007 | Blythe |
| 2008/0278460 | A1 | 11/2008 | Arnett et al. |
| 2009/0091553 | A1 | 4/2009 | Keam et al. |
| 2009/0115919 | A1 | 5/2009 | Tanaka et al. |
| 2009/0153519 | A1 | 6/2009 | Suarez Rovere |
| 2011/0074734 | A1 | 3/2011 | Wassvik et al. |
| 2012/0146948 | A1 | 6/2012 | Tong et al. |

FOREIGN PATENT DOCUMENTS

| | | |
|---|---|---|
| WO | WO 2009/077962 | 6/2009 |
| WO | WO 2010/006882 | 1/2010 |
| WO | WO 2010/006883 | 1/2010 |
| WO | WO 2010/006884 | 1/2010 |
| WO | WO 2010/006885 | 1/2010 |
| WO | WO 2010/006886 | 1/2010 |
| WO | WO 2010/134865 | 11/2010 |
| WO | WO 2011/049511 | 4/2011 |
| WO | WO 2011/049513 | 4/2011 |
| WO | WO 2011/139213 | 11/2011 |

OTHER PUBLICATIONS

USPTO Office Action dated Apr. 3, 2013 for co-pending U.S. Appl. No. 13/325,877.

U.S. Office Action dated Dec. 17, 2013, issued in U.S. Appl. No. 13/325,877.

* cited by examiner

SCANNING FTIR SYSTEMS FOR TOUCH DETECTION

CROSS-REFERENCE TO RELATED APPLICATIONS

The present application claims the benefit of Swedish patent application No. 1051335-6, filed on Dec. 16, 2010, and U.S. provisional application No. 61/423,791, filed on Dec. 16, 2010, which are incorporated herein by reference.

The invention is also related to U.S. provisional application No. 61/423,763, which was filed on Dec. 16, 2010 and is incorporated herein by reference.

TECHNICAL FIELD

The present invention relates to touch detection techniques, in particular optical detection of touching objects on a touch surface.

BACKGROUND ART

To an increasing extent, touch-sensitive panels are being used for providing input data to computers, electronic measurement and test equipment, gaming devices, etc. The panel may be provided with a graphical user interface (GUI) for a user to interact with using e.g. a pointer, stylus or one or more fingers. The GUI may be fixed or dynamic. A fixed GUI may e.g. be in the form of printed matter placed over, under or inside the panel. A dynamic GUI can be provided by a display screen integrated with, or placed underneath, the panel or by an image being projected onto the panel by a projector.

There are numerous known techniques for providing touch sensitivity to the panel, e.g. by using cameras to capture light scattered off the point(s) of touch on the panel, or by incorporating resistive wire grids, capacitive sensors, strain gauges, etc into the panel.

US2004/0252091 discloses an alternative technique which is based on Frustrated Total Internal Reflection (FTIR). Light is generated by discrete light sources at fixed locations on the panel. The emitted light is coupled into the panel so as to propagate inside the panel by total internal reflection while expanding in the plane of the panel. Arrays of light sensors are located around the perimeter of the panel to detect the light. When an object comes into contact with a surface of the panel, the light will be locally attenuated at the point of touch. The location of the object is determined by triangulation based on the detected light.

WO2010/006886 discloses an alternative FTIR system, which comprises an illumination arrangement configured to generate and sweep a number of beams of light along an incoupling site on the panel, such that the beams are caused to propagate by TIR in the panel while being swept or scanned across a sensing area on the panel. In the particular FTIR system disclosed in WO2010/006886, one or more light sensors are optically coupled to an elongate outcoupling site on the panel downstream of the sensing area, such that the light sensors are arranged to measure the received energy of the respective beam within the outcoupling site during the sweep. The location of a touching object in the sensing area is determined based on received energy of the respective beam within the outcoupling site as a function of the sweep.

Similar, alternative or supplementary FTIR systems are disclosed in WO2010/006882, WO2010/006884 and WO2010/006885.

SUMMARY

It is an overall objective of the invention to provide an alternative to known FTIR systems.

Another objective is to provide an FTIR system with reduced sensitivity to tolerances in the illumination arrangement.

Yet another objective is to provide an FTIR system which is suitable for mass production.

A still further objective is to enable a simplified design of an FTIR system.

One or more of these objectives, and other objectives that may appear from the description below, are at least partly achieved by means of a touch-sensitive apparatus, a method for controlling a touch-sensitive apparatus, and a computer program product according to the independent claims, embodiments thereof being defined by the dependent claims.

A first aspect of the invention is a touch-sensitive apparatus, comprising: a light transmissive panel that defines a touch surface and an opposite surface, an illumination arrangement for propagating light by internal reflection between the touch surface and the opposite surface from an elongated incoupling site on the panel to an elongated outcoupling site on the panel, and a detection arrangement for detecting light reaching the elongated outcoupling site, wherein the illumination arrangement is configured to sweep a first set of individual beams of light along different subsets or parts of the elongated incoupling site to generate a full beam sweep along the elongated incoupling site.

The touch-sensitive apparatus enables any interaction between animate or inanimate objects and the touch surface to be monitored based on the light that is detected by the detection arrangement. For example, location, size or shape of touching objects may be determined.

The incoupling and outcoupling sites are elongated continuous regions or areas on the light transmissive panel where the light is coupled into and out of, respectively, the light transmissive panel. The elongated incoupling and outcoupling sites are typically defined near or at the perimeter of the touch surface. The elongated incoupling or outcoupling site may, but need not, be defined by a dedicated coupling element which is attached to the panel to enable or facilitate proper injection or extraction of light.

According to the first aspect, the first set of individual beams collectively define a full beam sweep along the elongated incoupling site to illuminate the touch surface (or part thereof) from the inside of the transmissive panel. Each individual beam in the first set is thus controlled to generate a "sub-sweep" of the extent of the elongated incoupling site, i.e. a shorter beam sweep than the full sweep. It should be noted that a "full sweep" need not cover the entire length of the incoupling site, but covers the relevant portion of the incoupling site necessary for illuminating the touch surface (or part thereof).

In one embodiment, the different subsets collectively cover the relevant portion of the incoupling site, such that the sub-sweeps collectively form a full sweep of the incoupling site.

The use of plural short sweeps, in contrast to a single full sweep, allows the illumination arrangement, or rather its sweep generating device, e.g. a beam scanner, to be placed closer to the incoupling site. It is realized that this may reduce the impact of tolerances in the illumination arrangement, e.g. tolerances that result in unintended deviations in the direction and/or location of the individual beams during the sweep. The shorter sweep may alternatively, or additionally, be used to relax the performance requirements of the illumination arrangement. Specifically, it may be possible to use simpler/cheaper sweep generating devices.

In one embodiment, the different subsets may be essentially non-overlapping, since this will minimize the extent of each sub-sweep. By "essentially non-overlapping" is meant that the overlap of two subsets is less than about 10%, preferably less than 5%, and most preferably less than about 1% of their combined length.

As will be further explained below, the incoupling site may be swept by a second (and third, etc) set of individual beams, where each individual beam is controlled to generate a sub-sweep of the incoupling site. The touch-sensitive apparatus may also include a further pair of incoupling and outcoupling sites, where the full beam sweep of the further incoupling site may be formed by sub-sweeps. In all of these different embodiments, the illumination arrangement may generate the sub-sweeps sequentially, in any order. It is also conceivable that two or more sub-sweeps are generated concurrently.

The use of sub-sweeps may also provide further advantages, as will be explained below in relation to different embodiments and specific examples.

In one embodiment, each individual beam in the first set of beams forms a first beam leg inside the panel which originates from and is translated along one of the different subsets of the incoupling site. Thus, the illumination arrangement is configured to generate a beam leg which corresponds to a beam that propagates from a location in the incoupling site to a location in the outcoupling site by internal reflections inside the panel. The beam leg may be regarded as a simplified representation of the beam, formed by projecting the propagating beam onto the touch surface. Thus, a beam leg is formed as a straight path (possibly with varying width) across the touch surface, and this straight path is translated along the incoupling site by the collective operation of the sub-sweeps.

In one embodiment, each first beam leg has an essentially invariant main direction in the plane of the touch surface while being translated. As used herein, an "essentially invariant main direction" is intended to indicate that variations in main direction for a beam leg do not exceed ±2°, and preferably ±1°. Such variations may be intentional or unintentional. Intentional variations may be caused by physical constraints of the illumination arrangement, resulting in an active choice to design the illumination arrangement with certain variations in the main direction of a beam leg during a sub-sweep or a full sweep. Unintentional variations may be caused by inaccuracies in the illumination arrangement, e.g. in the sweep generating device.

In one embodiment, the first beam legs that are formed by the first set of beams have essentially the same main direction in the plane of the touch surface. Such an embodiment enables the use of the touch detection techniques disclosed in aforesaid WO2010/006886, in which two or more beam legs of different and constant main directions are swept or scanned across the touch surface via one and the same incoupling site. In one such embodiment, the illumination arrangement is further configured to sweep a second set of individual beams of light along different subsets of the incoupling site to generate a full beam sweep along the incoupling site, wherein each individual beam in the second set of beams forms a second beam leg inside the panel which originates from and is translated along one of the different subsets of the incoupling site, wherein each second beam leg has an essentially invariant main direction in the plane of the touch surface while being translated, and wherein the first beam legs and the second beam legs have different main directions in the plane of the touch surface. It should be noted that the extent and location of the different subsets of the incoupling site may differ for the first and second sets of beams.

In one embodiment, the illumination arrangement comprises a set of leg generation systems, each leg generation system being configured to generate and sweep one of the individual beams of the first set of beams along the associated subset of the incoupling site. Such an embodiment, in which each sub-sweep is generated by a dedicated leg generation system, enables both a simplified structure of the touch-sensitive apparatus and simplified assembly, adjustment, repair and maintenance of the apparatus. The illumination system can be modularized, such that the leg generation systems may be operated and assembled independently of each other, and they may also be independently adjusted and repaired, if needed. It is also possible to replace a leg generation system, or a component thereof, without needing to adjust other leg generation systems in the touch-sensitive apparatus. It should be noted though that the leg generation systems may, but need not, be configured as a unitary components. Each leg generation system may instead be formed as an assembly of individual components. It is also to be noted that each leg generation system may be configured to generate and sweep an individual beam of both a first and second (and possibly further) sets of beams along one of the different subsets of the incoupling site, such that one leg generation system is operable to translate both a first and a second beam leg (and possibly further beam legs) across a portion of the touch surface.

In one embodiment, at least two of the leg generation systems are identical, and preferably all leg generation systems in the set of leg generation systems are identical. This will serve to reduce costs and facilitate the design of the touch-sensitive apparatus. For example, it is possible to use the same leg generation system(s) for different sizes and aspect ratios of the touch surface. This is a significant advantage that enables low cost mass production of different models of the touch-sensitive apparatus.

In one embodiment, each leg generation system comprises at least one scanner module configured to sweep an input beam around an axis of rotation, and an elongate optical device configured to receive and optically re-direct the input beam so as to form the individual beam. The scanner module is a standard unitary component which may be assembled and tested separately from the touch-sensitive apparatus. Such a scanner module may contain electro-mechanical structures that are operable to deflect light from a light source so as to sweep the input beam around the axis of rotation. Thereby, the scanner module generates an "angular scan" of the input beam. The light source may or may not be part of the scanner module. The use of scanner modules will facilitate assembly, repair and maintenance of the touch-sensitive apparatus, since a single scanner module may be mounted independently of other scanner modules in the leg generating systems of the apparatus. It may be recalled that the use of sub-sweeps enables use of scanner modules with a smaller or less accurate angular scan, potentially lowering the cost of the scanner modules. The elongate optical device is configured as a stationary re-directing device that converts the scanner module's angular scan of the input beam into a sub-sweep of the incoupling site and thus a sub-sweep of a beam leg with any desired main direction across the touch surface, e.g. as described above. It is to be understood that the use of sub-sweeps generally enables the use of shorter elongate optical devices, which may reduce cost and/or improve performance.

In one embodiment, the scanner module comprises at least one MEMS scanner. A MEMS (Micro-Electro-Mechanical Systems) scanner is a miniaturized device, typically with a size on the order of a few millimeters. The use of MEMS scanners will enable a compact and space-efficient design of the illumination arrangement.

In one embodiment, the elongate optical devices in the set of leg generation systems include identical re-directing properties. By "re-directing properties" is meant the ability of the elongate optical device to re-direct an incoming ray of light, in dependence of the angle of the ray, as a function of the location along the elongate optical device. If the elongate optical devices include identical re-directing properties, all the elongate optical devices may be manufactured from a single master, e.g. by merely an elongate replica of the master into a suitable length for the respective leg generation system. This enables a significant cost reduction in mass production of the apparatus, since a single master can be used to produce all re-directing devices for one or more sets of leg generating systems for a touch-sensitive apparatus, or even for a product line of touch-sensitive apparatuses with different sizes and aspect ratios.

In one embodiment, the elongate optical device has a refractive power along its length. Thus, the re-directive properties of the elongate optical device originate from refraction, and the optical device has a focal length. Such a device may be used to generate a beam leg with an essentially invariant main direction by arranging the axis of rotation of the angular scan in or near the focal plane of the optical device, where the position of the axis of rotation determines the main direction of the resulting beam leg. The elongate optical device may or may not have a refractive power also in the depth direction.

In one embodiment, the elongate optical device is one of a Fresnel lens and a diffractive optical element (DOE), which both are compact and well-proven components that can be designed with desired re-directing properties. The diffractive optical component (DOE) may be a grating, such as a holographic grating.

In one embodiment, each leg generation system further comprises an elongate grating structure which is arranged to generate the individual beam as part of a set of diffracted beams with a predetermined angular spacing. Thereby, the diffracted beams may form the above-mentioned first and second beam legs (and optionally further beam legs). Thus, more than one beam leg may be generated from a single input beam that is swept along the elongate optical device by a single scanner module. In such an embodiment, the angle between main directions of beam legs is given by the angular spacing of the diffracted beams. The grating structure may be arranged downstream of the elongate optical device, so as to receive and diffract the re-directed beam. Alternatively, the grating structure may be integrated into the elongate optical device.

In one embodiment, the leg generation systems are at least partly arranged beneath the panel with respect to the touch surface. This may serve to decrease the footprint of the touch-sensing apparatus.

In another embodiment, the leg generation systems are arranged outside the perimeter of the touch surface. This may serve to decrease the thickness of the touch-sensing apparatus.

In one embodiment, the detection arrangement comprises an elongate light-sensing surface or an array of light-sensing elements arranged parallel to and optically facing the outcoupling site. This enables a compact design of the detection arrangement, since the light-sensing surface/elements may be arranged close to the outcoupling site. The elongate light-sensing surface is suitably arranged to collect all light from the outcoupling site, which calls for time-resolved detection of the light reaching the outcoupling site. The use of an elongate light-sensing surface therefore requires the sub-sweeps to be generated sequentially. The use of an array of light-sensing elements enables spatially resolved detection of the light reaching the outcoupling site. Such use may enable concurrent generation of the sub-sweeps, but will require different beam legs (first, second, etc) to be generated sequentially.

In another embodiment, the detection arrangement comprises a first set of leg detection systems, wherein each leg detection system is configured to receive one of the individual beams, wherein the leg detection system comprises an elongate re-directing device which is arranged parallel to and optically faces the outcoupling site and which is configured to receive and re-direct the individual beam onto a detection region while the individual beam is swept along the incoupling site, and a light sensor which is located at said detection region to measure the energy of the individual beam. This embodiment calls for time-resolved detection of the light that reaches the light sensor. Since each individual beam is directed onto a respective light sensor, this embodiment may enable concurrent generation of the sub-sweeps. If the touch-sensitive apparatus operates with first and second (and possibly further) beam legs, the elongate re-directing device of each beam detecting system may be configured to re-direct the different beam legs to different detection regions, and a respective light sensor may be located at the different detection regions to measure the energy of each beam leg. Thus, such an embodiment may enable concurrent generation of two or more beam legs.

A second aspect of the invention is a touch-sensitive apparatus, comprising: a light transmissive panel that defines a touch surface and an opposite surface; means for propagating light by internal reflection between the touch surface and the opposite surface from an elongated incoupling site on the panel to an elongated outcoupling site on the panel; and means for detecting light reaching the elongated outcoupling site; wherein the means for propagating light is configured to sweep a first set of individual beams of light along different subsets of the elongated incoupling site to generate a full beam sweep along the elongated incoupling site.

A third aspect of the invention is a method of operating a touch-sensitive apparatus. The method comprises the steps of: propagating light by internal reflection between a touch surface and an opposite surface of a light transmissive panel, from an elongated incoupling site on the panel to an elongated outcoupling site on the panel; and detecting light reaching the elongated outcoupling site; wherein the step of propagating light comprises sweeping a first set of individual beams of light along different subsets of the elongated incoupling site to generate a full beam sweep along the elongated incoupling site.

A fourth aspect of the invention is a method of operating a touch-sensitive apparatus. The method comprises the steps of: controlling an illumination arrangement to propagate light by internal reflection between a touch surface and an opposite surface of a light transmissive panel, from an elongated incoupling site on the panel to an elongated outcoupling site on the panel; and controlling a detection arrangement to detect light reaching the elongated outcoupling site; wherein the illumination arrangement is controlled to sweep a first set of individual beams of light along different subsets of the elongated incoupling site to generate a full beam sweep along the elongated incoupling site.

A fifth aspect of the invention is a computer program product comprising computer code which, when executed on a data-processing system, is adapted to carry out the method of the fourth aspect.

The second to fifth aspects share the advantages of the first aspect. It is to be understood that any one of the embodiments of the first aspect can be embodied also in the second to fifth aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

The present invention relates to a touch-sensitive apparatus that derives its touch sensitivity from light that propagates inside a transmissive panel while interacting with a touch surface of the panel. The interaction is formed when the propagating light is reflected by total internal reflection in the touch surface. When an object is brought into contact with the touch surface, the propagating light is disrupted ("frustrated"), causing an attenuation of the propagating light. By propagating light from different directions across the touch surface to form a grid of detection lines, and by measuring the energy of the received light for each detection line, the location of the object may be determined by processing the energy values for the detection lines.

The touch-sensitive apparatus thus utilizes the phenomenon of Frustrated Total Internal Reflection, FTIR. In the following; this type of touch-sensitive apparatus is denoted an "FTIR system". FTIR systems have the potential of providing multi-touch sensitivity, i.e. an ability to detect plural simultaneously touching objects. One implementation is an "FTIR scan beam system", which is configured to generate at least part of the detection lines by sweeping one or more beams inside the panel, across at least part of the touch surface. FTIR scan beam systems are known in the art, and for the general principles of illumination, detection, and data processing in such systems reference is made to the aforesaid WO2010/006882, WO2010/006884, WO2010/006885, and WO2010/006886, all of which are incorporated herein by this reference. The following disclosure will focus on embodiments for generating the beam sweeps in FTIR scan beam systems, and specific implementations thereof. Throughout the description, the same reference numerals are used to identify corresponding elements.

Figure 1A:
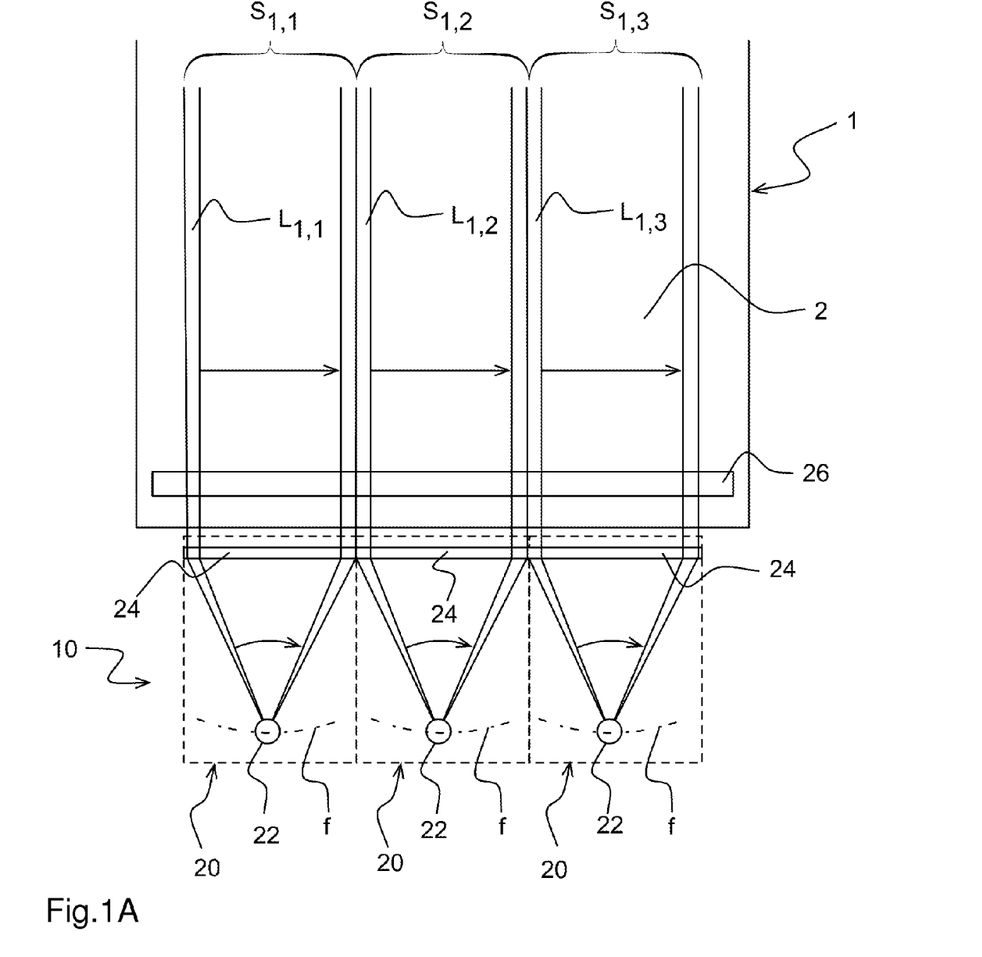
FIG. 1A is a top plan view of an illumination arrangement in an FTIR system.
Figure 1B:
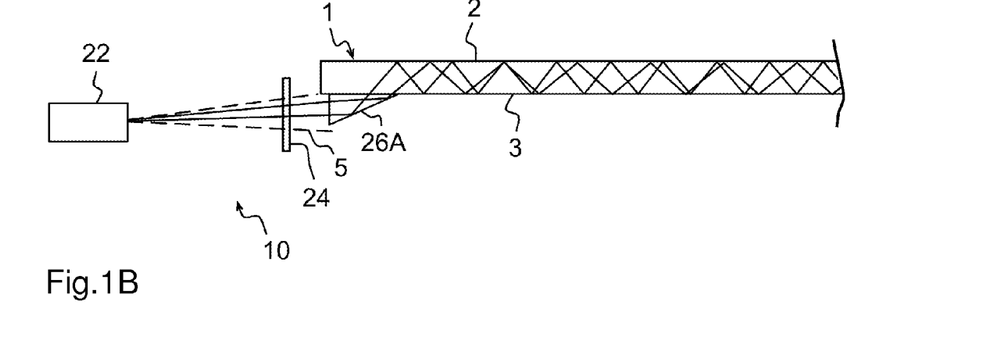
FIG. 1B is a side view of the arrangement in FIG. 1A.

FIGS. 1A and 1B are top plan and side views, respectively, of an illumination arrangement 10 in an FTIR system. As shown, beams generated by the illumination arrangement are coupled into a light transmissive panel 1 to propagate between a touch surface 2 and an opposite surface 3. The beams are also swept across the touch surface 2 (or a portion thereof) to define part of the above-mentioned detection lines. In this and all other examples given herein, each beam is subjected to a pure translation across the panel 1, i.e. it has an essentially invariant main direction in the plane of the panel during the sweep. In other words, the "scan angle" of the beam in the plane of the panel 1 is essentially constant. It is to be understood that further detection lines need to be generated in the system of FIG. 1A to enable touch determination.

In the following description, a beam that propagates across the touch surface 2 is denoted a "beam leg". As indicated in FIG. 1A, beam legs are swept across the touch surface as distinct segments $S_{1,1}$, $S_{1,2}$, $S_{1,3}$, where segment $S_{1,1}$ is formed by sweeping leg $L_{1,1}$, segment $S_{1,2}$ is formed by sweeping leg $L_{1,2}$, and segment $S_{1,3}$ is formed by sweeping leg $L_{1,3}$. Collectively, the segments $S_{1,1}$, $S_{1,2}$, $S_{1,3}$ form a leg sweep across the touch surface 2.

Each segment $S_{1,1}$, $S_{1,2}$, $S_{1,3}$ is generated by a separate leg generation system 20 (indicated by dashed lines in FIG. 1A), denoted "segment generator" in the following. Each segment generator 20 includes a scanner module 22, which is a unitary component that includes at least one movable deflection element (not shown) which is controllable to deflect (scan) a beam of light from a light source (not shown) in a desired direction around an axis of rotation. The light source may, and typically is, included in the scanner module 22. The scanner module 22 thus generates an angular scan of an input beam. The angularly scanned input beam is converted into a lateral translation of a re-directed beam by means of an elongate re-directing element in the form of a Fresnel lens 24. The Fresnel lens 24 is designed with a refractive power along its length (FIG. 4A) to define a focal plane f. In FIG. 1A, the rotation axis of the angular scan essentially coincides with the focal point of the Fresnel lens 24, whereby the re-directed beam is emitted perpendicularly from the exit surface of the Fresnel lens 24.

The re-directed beam is emitted by the segment generator 20 and swept along a subset of an elongate incoupling site 26, which is defined by an elongated incoupling element in the form of a wedge 26A. The incoupling site 26 is thus an elongated region where light enters the panel 1. FIG. 1B illustrates how a few rays of the input beam are coupled into and propagates within the panel 1. As seen, the wedge 26A couples the re-directed beam into the panel 1 such that the beam is reflected between the touch surface 2 and the opposite surface 3. The beam is reflected in the touch surface 2 by total internal reflection (TIR). The beam may be reflected by TIR also in the opposite surface 3, e.g. if the panel 1 needs to be transparent for viewing through the touch surface 2, or if the opposite surface 3 also is to be used as a touch surface. Otherwise, the opposite surface 3 may be provided with a reflective coating.

In the illustrated embodiment, the scanner module 22 emits a diverging beam, both in the plan of the touch surface 2 (FIG. 1A) and in the depth direction (indicated by light cone 5 in FIG. 1B). After passing the Fresnel lens 24, the beam is collimated in the plane of the touch surface 2 (FIG. 1A). Alternatively, the beam exiting the Fresnel lens 24 may be converging or diverging. It is to be noted that the beam may expand in the plane of the touch surface 2 away from the incoupling site 26, e.g. caused by light scattering phenomena in the panel 1. Techniques for taking such beam expansion ("dispersion") into account in the touch determination are further disclosed in WO2010/006883. In the example of FIG. 1B, the beam is diverging in the depth direction when it is coupled into the panel 1. This is done to increase the uniformity of the light that illuminates the touch surface 2 from inside the panel 1.

In FIG. 1B, the width of the light cone 5 exceeds the width of the entry face of the wedge 26A, as seen in the depth direction. By nominally designing the illumination arrangement 10 with such an extended light cone, the impact of tolerances may be reduced, e.g. tolerances that cause variations in the direction of the light cone during the sweep. In FIG. 1B, the light cone 5 is directed with its main direction essentially normal to the entry face of wedge 26A. This reduces reflective losses. In one embodiment (not shown), the light cone 5 is formed and directed such that the re-directed beam is coupled into the panel 1 without being reflected inside the wedge 26A. This may reduce the impact of manufacturing tolerances of the wedge 26A, e.g. surface unevenness.

A number of technical advantages may be obtained by sweeping beam legs across the touch surface 2 as distinct segments, compared to sweeping a single beam leg across the extent of the touch surface 2.

One advantageous effect is that the required sweep angle of the individual scanner modules 22 is reduced, since the angular scan only needs to sweep a subset of the incoupling site 26. This may in turn enable the use of simpler and/or cheaper scanner modules 22.

Another advantageous effect is that the length of the Fresnel lenses 24 can be reduced, which may lower the cost for each Fresnel lens 24 and/or allow for increased quality of the Fresnel lenses 24 for a given unit cost.

Another advantageous characteristic of the illumination arrangement 10 is that the scanner modules 22 may operate independently of each other to sweep the legs $L_{1,1}$, $L_{1,2}$, $L_{1,3}$ across the touch surface 2. This facilitates assembly as well as service and maintenance, since each scanner module 22 may be mounted and adjusted without regard to other scanner modules 22. This also means that a faulty scanner module 22 may be replaced in a simple manner.

The following applies to all embodiments disclosed herein. The deflection elements for the scanner module 22 may e.g. be selected from the group comprising a rotating mirror, a resonant mirror, a galvanometer mirror, a MEMS (Micro-Electro-Mechanical Systems) unit, a MOEMS (Micro Opto-Electrical-Mechanical Systems) unit, a liquid crystal, a vibrating mirror, an opto-acoustic unit, etc. Any type of light source capable of emitting light in a desired wavelength range may be used, for example a diode laser, a VCSEL (vertical-cavity surface-emitting laser), or an LED (light-emitting diode), an incandescent lamp, a halogen lamp, etc. The light source may operate in any suitable wavelength range, e.g. in the infrared or visible wavelength region. All beams may be generated with identical wavelength. Alternatively, certain beam sweeps may be generated with light in different wavelength ranges, permitting differentiation between the beam sweeps based on wavelength. Furthermore, the light sources may output either continuous or pulsed radiation. The re-directing element 24 need not be a Frensel lens, but could be any transmissive device that transmits and redirects the incoming radiation, or any reflective device that redirects the incoming radiation by reflection. The re-directing device 24 may be made up of diffractive optical elements (DOE), micro-optical elements, mirrors, refractive lenses, and any combination thereof. The incoupling element 26A, as well as any corresponding outcoupling element, may have any suitable shape and extent, and may be attached to the touch surface 2, the opposite surface 3, or the edge portion between the touch surface 2 and the opposite surface 3. A sheet-like microstructured coupling element is disclosed in U.S. provisional application No. 61/438,675, which was filed on Feb. 2, 2011 and is incorporated herein by reference. Alternatively, the incoupling/outcoupling element may be omitted, e.g. if light is coupled into and out of the panel 1 directly e.g. via one of the surfaces 2, 3 or the edge portion. The illumination arrangement 10 may comprise more than one incoupling site 26, and the incoupling site(s) 26 may have a straight or bent configuration on the surface of the panel 1. The panel 1 is made of solid material, in one or more layers. Generally, the panel 1 may be made of any material that transmits a sufficient amount of radiation in the relevant wavelength range to permit a sensible measurement of transmitted energy. Such material includes glass, poly(methyl methacrylate) (PMMA) and polycarbonates (PC). The panel 1 may be of any shape, such as circular, elliptical or polygonal, including rectangular.

Below, further embodiments will be disclosed. Unless stated otherwise, the description given for FIG. 1 is also applicable to these embodiments. The following description will thus focus on distinguishing features of each embodiment. For clarity of presentation, FIGS. 2-6 only indicate the main direction (center ray) of each beam, although the beams generally have an extent in the plane of the touch surface. Furthermore, all beam legs with a common scan angle are indicated by a common label: beam legs $L_{n,1}$, $L_{n,2}$, $L_{n,3}$ are indicated by L.

Figure 2:
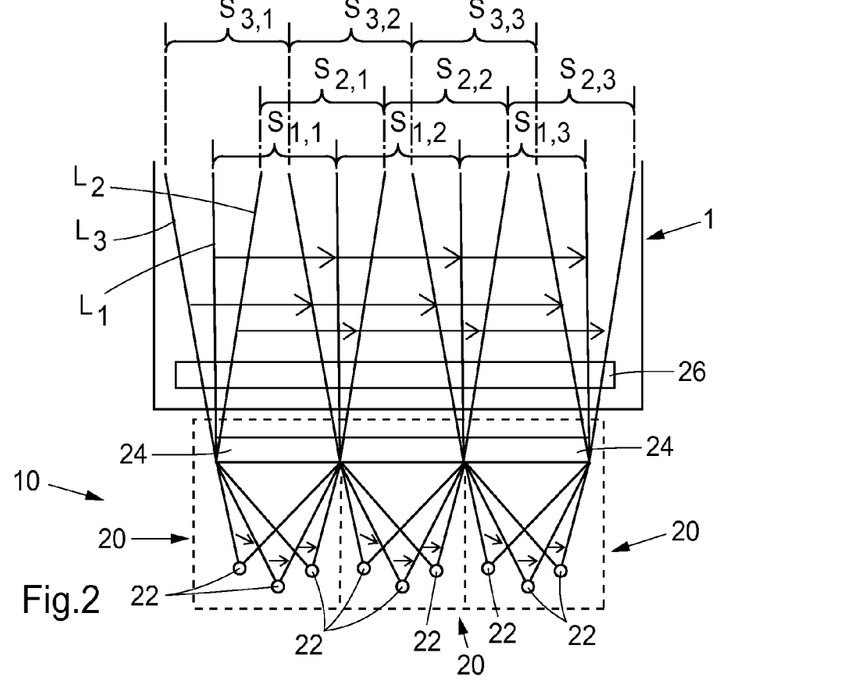
FIGS. 2-3 are top plan views of other embodiments of the illumination arrangement in an FTIR system.

FIG. 2 is a top plan view of another embodiment of an illumination arrangement 10 for an FTIR system. The illumination arrangement 10 is designed to operate with a so-called Ψ-scan configuration, which is disclosed in aforesaid WO2010/006886. In the Ψ-scan configuration, the touch surface 2 is swept by beam legs $L_1$, $L_2$, $L_3$ at three different and constant scan angles; a first scan angle that is essentially perpendicular to the incoupling site 26, and a second and a third scan angle that is smaller and larger, respectively than the first scan angle. As indicated by arrows in FIG. 2, the beam legs $L_1$, $L_2$, $L_3$ are swept across the touch surface in distinct segments $S_{1,1}$, $S_{1,2}$, $S_{1,3}$, $S_{2,1}$, $S_{2,2}$, $S_{2,3}$, $S_{3,1}$, $S_{3,2}$, $S_{3,3}$. Like in FIG. 1, the segments are generated by segment generators 20 arranged along the perimeter of the touch panel 2, but here each segment generator 20 is capable of generating one segment for each leg $L_1$, $L_2$, $L_3$. In the illustrated embodiment, each segment generator 20 includes three scanner modules 22 which are arranged at different locations in the focal plane f of the Fresnel lens 24. As indicated in FIG. 1, the focal plane need not be planar, but can be curved, e.g. shaped as an arc. It is well known for the skilled person that many lenses give a field curvature (also known as Petzval field curvature), and that this results in a curved focal plane. When the beam from the central scanner module 22 in any segment generator 20 is swept along the Fresnel lens 24, the re-directed beam is emitted perpendicularly to the exit surface of the lens 24. Looking at the left-hand segment generator 20, the re-directed beam is swept along a portion of the incoupling site 26 to form a first leg segment $S_{1,1}$. Similarly, redirected beams originating from the left-hand and right-hand scanner modules 22 are swept along portions of the incoupling site 26 to form a second leg segment $S_{2,1}$ and a third leg segment $S_{3,1}$ with legs $L_2$, $L_3$ angled to the right and left, respectively, of the first leg $L_1$.

Figure 3:
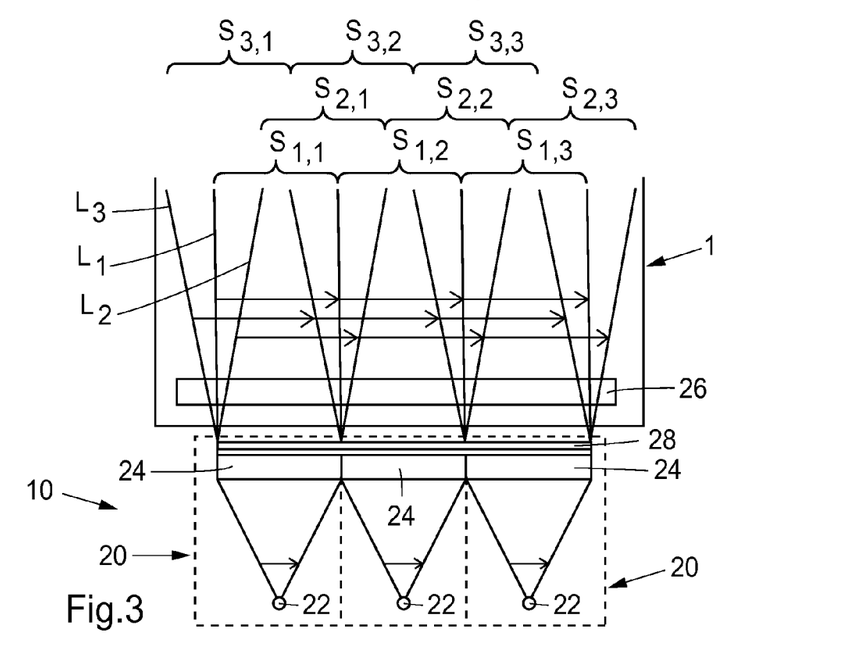

FIG. 3 is a top plan view of yet another embodiment of an illumination arrangement 10 for an FTIR system. Like in FIG. 2, the illumination arrangement 10 is designed to operate with a so-called Ψ-scan configuration. Each segment generator 20 includes a single scanner module 22, which is arranged to sweep a beam along Fresnel lens 24, which thereby generates a re-directed beam. In the illustrated example, the re-directed beam is emitted perpendicularly to the exit surface of the Fresnel lens 24. A transmission grating 28 is arranged between the Fresnel lens 24 and the incoupling site 26. The grating 28 is designed to generate a zero-order beam as well as first-order beams on the sides of the zero-order beam. These diffraction-generated beams are swept along a respective portion of the incoupling site 26 to form the leg segments. For example, the left-hand segment generator 22 thereby forms the first, second and third leg segments $S_{1,1}$, $S_{2,1}$ and $S_{3,1}$.

The grating 28 is typically designed to have the same diffractive properties along its length. The grating 28 may be implemented either as a single elongate component that extends alongside the Fresnel lenses 24 (as shown), or as shorter grating components that are aligned with a respective Fresnel lens 24.

The mutual angles between the different beam legs $L_1$, $L_2$, $L_3$ are determined by the properties of the grating 28 according to the well-known grating equation $d_s \cdot (\sin \theta_m + \sin \theta_t) = m \cdot \lambda$, with $d_s$ being the spacing of diffracting elements in the grating, $\theta_t$ being the angle of incidence of the beam that impinges on the grating, m being the order, $\lambda$ being the wavelength of the radiation, and $\theta_m$ being the angle between each the beam of order m and the normal direction of the grating. The grating equation is generally applicable to all types of gratings.

It should be realized that other scan angles of the different beam legs $L_1$, $L_2$, $L_3$ and/or another number of beam legs $L_1$, $L_2$, $L_3$ may be used. For example, a larger number of beam legs $L_1$, $L_2$, $L_3$ may be achieved by using a grating 28 designed to also generate beams of higher orders.

In an alternative embodiment, the grating 28 is integrated in the Fresnel lens 24. In another alternative, the grating 28 is arranged upstream of the Fresnel lens 24, although this may generate larger variations in the scan angles of the beam legs $L_1$, $L_2$, $L_3$ during the sweep. In another alternative, the Fresnel lenses 24 are replaced by re-directing devices that are configured to generate a set of output beams with well-defined mutual angles, based on a single input beam. Such a re-directing device may comprise a set of elongate re-directing segments (not shown) arranged on top of each other in the depth direction, where each re-directing segment is arranged to generate an output beam in a unique direction, when swept by an input beam. These and further alternatives are described in more detail in aforesaid WO2010/006886.

Figure 4A:
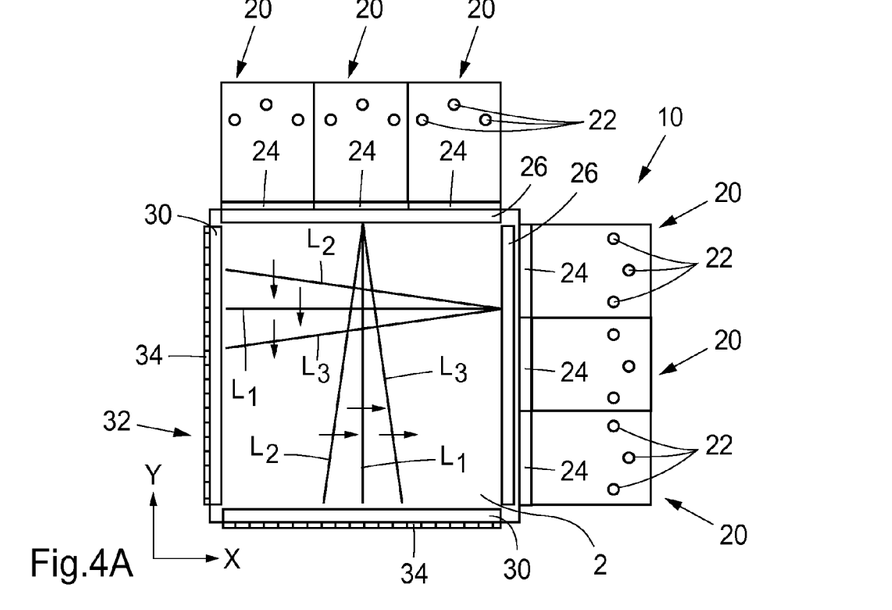
FIGS. 4A-4B are a top plan views of embodiments of an FTIR system with an illumination arrangement as shown in FIG. 2.

FIG. 4A is a top plan view of an FTIR system having two incoupling sites 26 and two outcoupling sites 30. Each incoupling site 26 is associated with three segment generators 20, which are operated to collectively sweep three differently angled beam legs $L_1$, $L_2$, $L_3$ across the touch surface 2 via each incoupling site 26. Thus, the FTIR system operates with a so-called dual P-scan configuration. The segment generators 20 are identical and configured to generate three leg segments each. The segment generators 20 may have the same configuration as in FIG. 2.

The outcoupling sites 30 may be defined in the same way as the incoupling sites 26, e.g. by elongate wedges being attached to the panel to define the outcoupling sites 30. The FTIR system also includes a detection arrangement 32, which is configured to measure the energy of each beam leg at the respective outcoupling site 30. In the illustrated embodiment, an array 34 of light sensing elements are arranged to receive the beam legs $L_1$, $L_2$, $L_3$ from the outcoupling sites 30. The light sensing elements may e.g. be attached to an exit surface of the wedge. The array 34 of light sensing elements may be implemented by a row of separate components for 0-dimensional light detection, such as photo detectors, or it may be implemented by the light sensing elements (pixels) of a 1- or 2-dimensional sensor, such as a CCD or CMOS sensor. By sampling output signals from the light sensing elements it is possible to detect the spatial distribution of light within the outcoupling site 30 during the leg sweeps. Thereby, the transmitted energy in each beam leg $L_1$, $L_2$, $L_3$ may be monitored as a function of the sweep. With this type of detection arrangement 32, the illumination arrangement 10 may be controlled to generate several leg segments at the same time. At one extreme, all segment generators 20 are activated to generate all leg segments concurrently. At another extreme, the segment generators 20 are activated to generate one leg segment at a time.

In an alternative embodiment, the array 34 of light sensing elements is replaced by an elongate light sensor for 0-dimensional detection. The elongate light sensor may be a single light sensing element such as a photo-detector, or it may be formed by grouping an array of light sensing elements, e.g. by summing/averaging the output of the individual light sensing elements (pixels) of a 1-dimensional sensor in hardware or software. In this embodiment, the received energy is monitored as a function of time, and the leg segments must be generated separately within each pair of incoupling and outcoupling sites 26, 30.

Figure 4B:
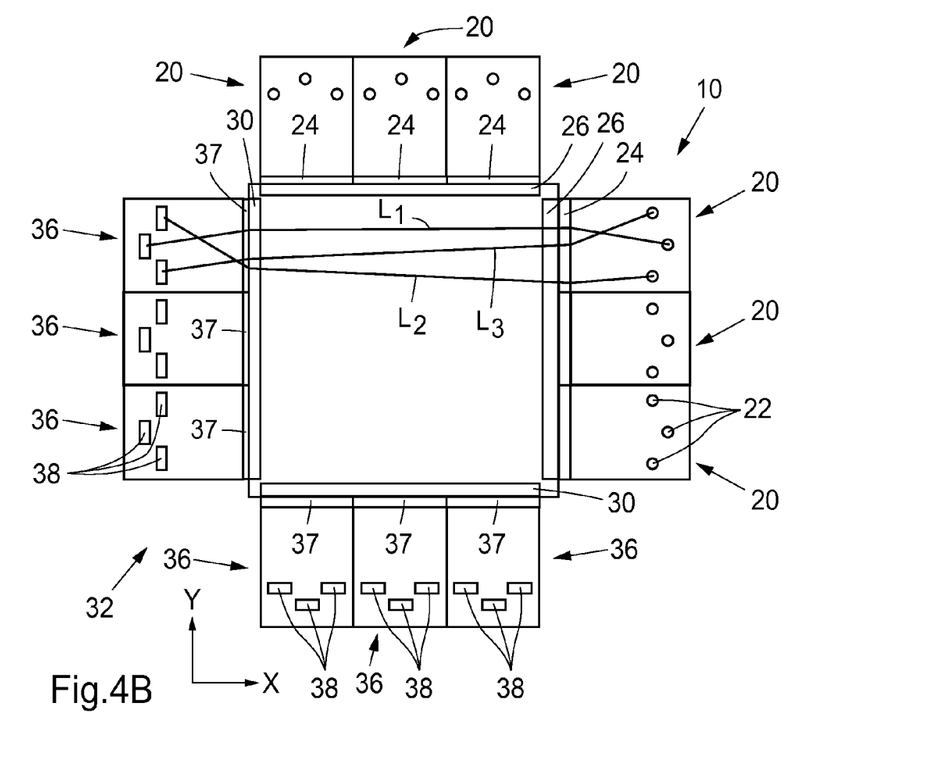

FIG. 4B illustrates an alternative embodiment of the FTIR system in FIG. 4A. Here, the detection arrangement 32 comprises segment receivers 36 which are aligned with the segment generators 20. Each segment receiver 36 is adapted to receive the leg segments generated by a segment generator 20 and to separately measure the energy of each leg segment. Each segment receiver 36 includes a re-directing device 37 which is arranged to be swept by a beam leg. The re-directing device 37 may be identical or at least similar to the re-directing device 24 of the segment generator 20. Thus, the re-directing device 37 may be an optical device, such as a Fresnel lens, which defines a focal plane parallel to and at a distance from its exit surface. All rays that impinge on the front surface at one and the same angle of incidence are directed to a detection region in the focal plane. Thus, it should be realized that the beam legs $L_1$, $L_2$, $L_3$ that are swept with different scan angles across the re-directing device 37 will be directed onto different detection regions during the sweep. As indicated in FIG. 4B, a light sensor 38 is arranged at each detection region to measure the energy of the beam leg $L_1$, $L_2$, $L_3$ as a function of the sweep. With this type of detection arrangement, the illumination arrangement 10 may be controlled to generate several leg segments at the same time.

The segment receivers 36 along the respective outcoupling site 30 are preferably identically configured. This will enable the energy of the beam legs $L_1$, $L_2$, $L_3$ to be detected throughout the entire outcoupling site 30. Looking at FIG. 4B, it should be realized that beam leg $L_3$, generated by the top-right segment generator will hit the middle-left segment receiver 36, instead of the top-left segment receiver 36, during part of the sweep. If the segment receivers 36 are identical, as shown in FIG. 4B, the energy of beam leg $L_3$ may be properly measured during this part of the sweep, since beam leg $L_3$ will be directed onto the bottom light sensor 38 in the middle-left segment receiver 36. This type of detection is denoted "over-scan detection" in the following.

It should be understood that the FTIR systems in FIGS. 4A-4B are only examples. For example, the segment generators 20 may be replaced by those in FIG. 3.

A number of technical advantages may be obtained in the FTIR systems of type shown in FIGS. 4A-4B, by separating the sweep of one or more beam legs across the touch surface into segments.

One advantageous effect is that it is possible to use identical scanner modules 22 for sweeping the X and Y directions, irrespective of the aspect ratio and size of the touch surface 2. This may lead to significant cost savings.

Another advantageous effect is that it is possible to install Fresnel lenses 24 with identical re-directing characteristics on all sides of the FTIR system, i.e. in all segments generators 20 and in all segment receivers 36 (if present). Thus, only one type of Fresnel lens may need to be produced for the FTIR system. This offers the possibility of significant cost savings, since the investment cost for producing a Fresnel lens may be high. It can be noted that this advantage is attained as long as the FTIR system is designed with the same focal length of all Fresnel lenses. Thus, the length of the Fresnel lenses may vary between the segment generators 20; they still can be cut from one and the same type of Fresnel lens.

Yet another advantageous effect is that one or only a few different types of Fresnel lenses 24 may be required to produce FTIR systems with touch surfaces 2 of many different aspect ratios and/or sizes.

It can also be noted that the segment generators 20 and/or segment receivers 36 may be configured as unitary components that can be separately tested, mounted, adjusted and replaced. This may facilitate the production and maintenance of FTIR systems even further. Unitary or not, the segment generators 20 and segment receivers 36 (if present) may be seen a fundamental building blocks that can be used to facilitate the design of FTIR systems, irrespective of aspect ratio and size of the touch surface 2.

Figure 5A:
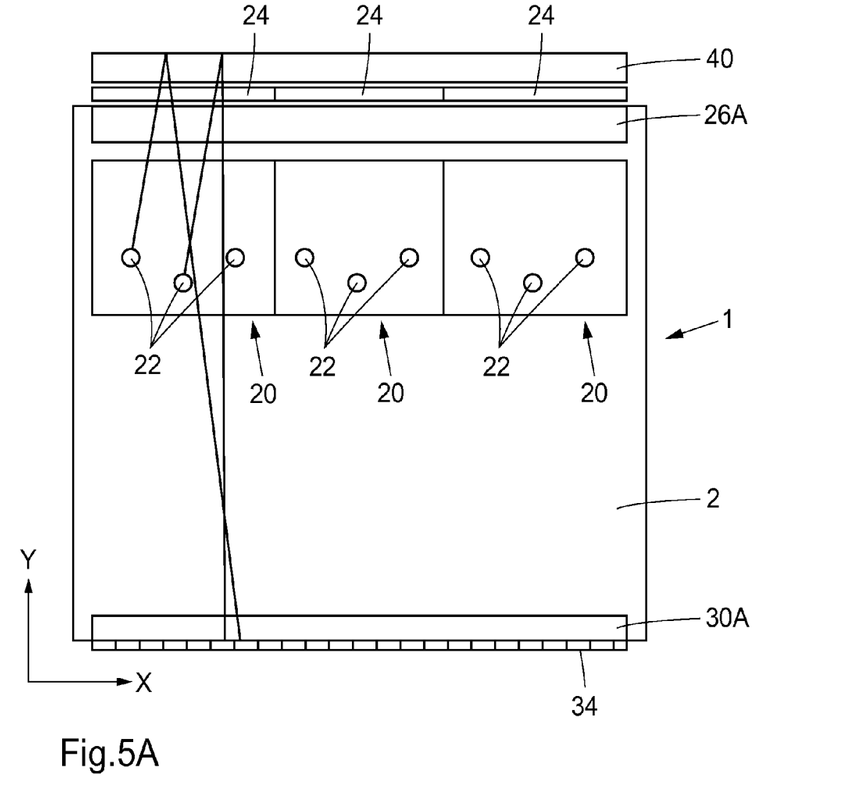
FIG. 5A is a top plan view of an FTIR system with a folded illumination arrangement.
Figure 5B:
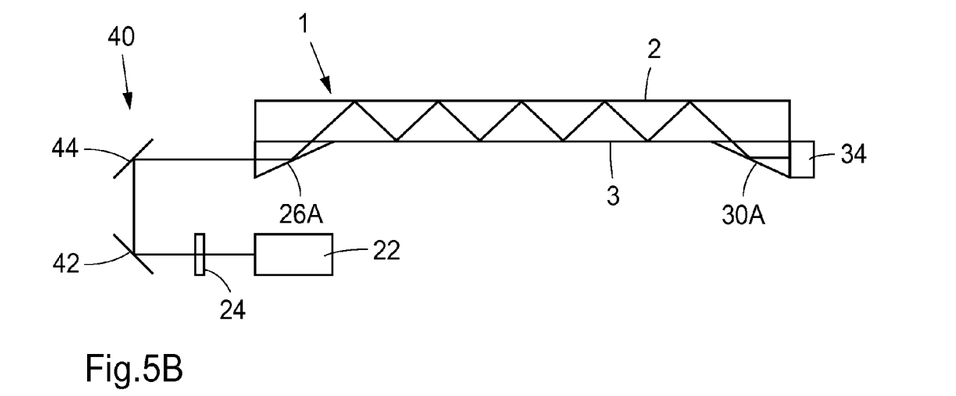
FIG. 5B is a side view of the system in FIG. 5A.

FIGS. 5A-5B illustrate another variant of the embodiment in FIG. 4A, in which the scanner modules 22 of the segment generators 20 are placed in a geometric plane underneath the panel 1 instead of outside its perimeter. A folding system 40 is arranged to direct the angular scan beam from the scanner modules 22 to the plane of the panel 1. In the illustrated embodiment, the angular scan beam is first re-directed by the re-directing device 24 and thereafter reflected by two stationary mirrors 42, 44, whereby the beam is folded into the plane of the panel 1. The re-directed beam is then coupled into the panel 1 via wedge 26A, propagates through the panel 1 by internal reflection and exits the panel via wedge 30A. The energy of the resulting beam leg is measured by the array 34 of light sensing elements attached to the exit surface of the wedge 30A.

Reverting to FIG. 3, it is to be understood that the use of a grating (28 in FIG. 3) may be advantageous in combination with a folding system 40, if the grating is placed downstream of the folding system 40, since the mirrors 42, 44 can be swept by a single angular scan beam from each segment generator 20. This enables the resulting re-directed beams (generated by the grating) to be swept in an essentially ideal flat plane along the incoupling element (wedge 26A). In contrast, when the mirrors 42, 44 are swept by plural angular scan beams from each segment generator 20, there may be small deviations between the resulting sweeps along the incoupling element, as seen in the depth direction. These deviations may or may not be significant, depending on the design and required performance of the system.

Figure 6A:
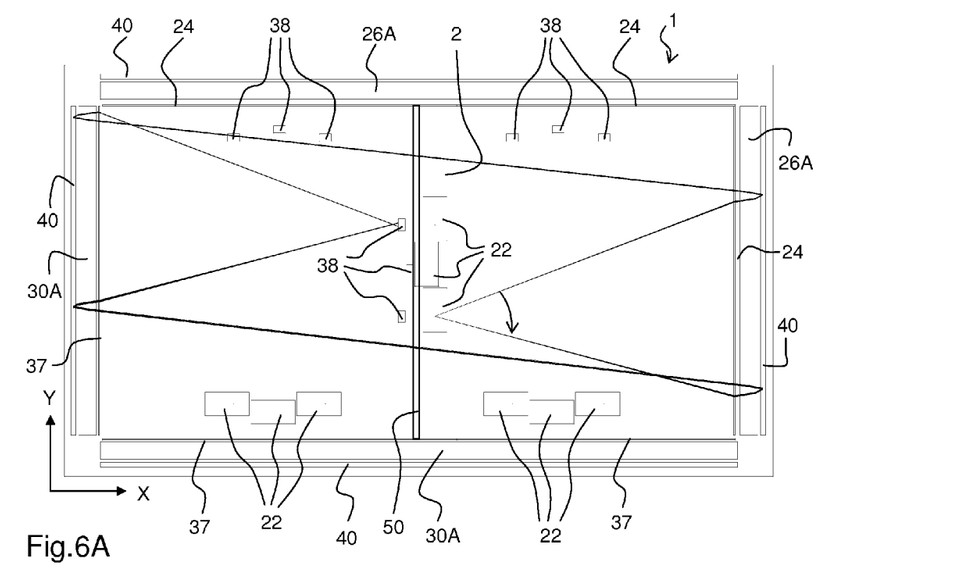
FIGS. 6A-6B are top plan views of an FTIR system with folded illumination and detection arrangements, illustrating beam sweeps in first and second directions of the FTIR system, respectively.
Figure 6B:
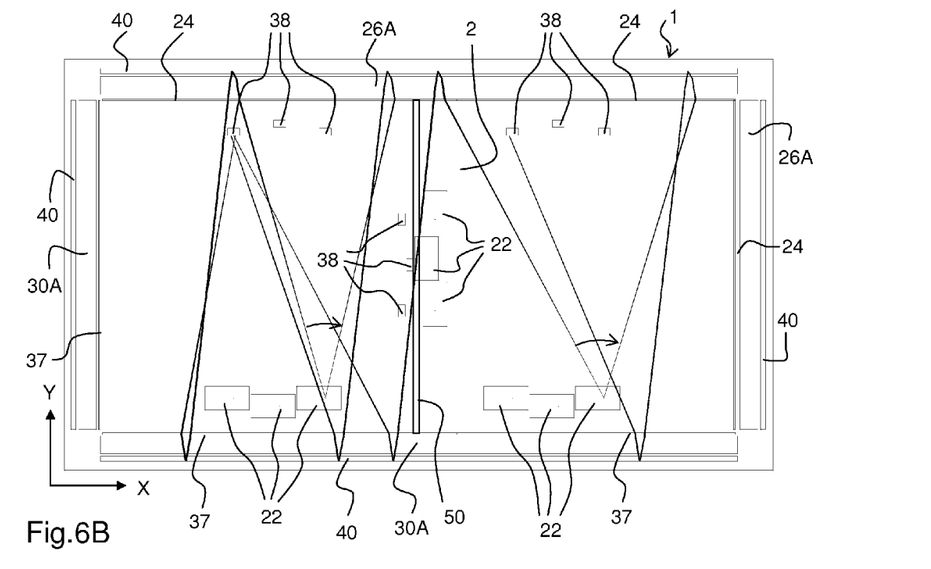

FIG. 6 illustrates an FTIR system with a rectangular panel 1. In this particular example, the touch surface 2 has an aspect ratio of 16:9. The FTIR system is a variant of the system in FIG. 4B, where both scanner modules 22 and light sensors 38 are placed beneath the panel 1, to reduce the footprint of the FTIR system. Each scanner module 22 is implemented as a unitary component, e.g. of the type found in laser printers, and may contain a laser source (not shown) and at least one deflecting element (not shown) that is controlled to generate an angular beam scan onto the re-directing Fresnel lens 24. The re-directed beam passes the folding system 40 and enters the panel 1 via incoupling element 26A. Downstream the touch surface 2, the beam leaves the panel 1 via outcoupling element 30A, passes the folding system 40, and hits a Fresnel lens 37 that re-directs the beam such that it hits the light sensor 38. It could be noted that the scanner modules 22 and the light sensors 38 are arranged in separate geometric planes beneath the panel 1.

The illustrated FTIR system has one segment generator and one segment receiver in the Y direction ("Y segment generator" and "Y segment receiver"), and two segment generators and two segment receivers in the X direction ("X segment generators" and "X segment receivers"). FIG. 6A indicates two beam paths between the Y segment generator and the Y segment receiver, and FIG. 6B indicates four beam paths between the first and second pairs of X segment generators and X segment receivers. It can be noted that one of the beam paths in FIG. 6B illustrates the above-mentioned over-scan detection.

As noted already in relation to FIG. 1, the use of plural segment generators 20 in one direction enables the use of shorter Fresnel lenses 24 and/or scanner modules 22 with smaller angular scans. Similarly, the use of plural segment generators 20 in one direction enables the use of shorter Fresnel lenses 37 for directing the beam legs onto the light sensors 38. In fact, all Fresnel lenses 24, 37 used in the FTIR system of FIG. 6 have identical re-directing characteristics, viz. the same refractive power along their length. It is thus possible to use a single type of Fresnel lens in the FTIR system, possibly with different lengths of the Fresnel lens in the X and Y segment generators/receivers. It can also be noted that by using plural segment generators 20 in one direction (or both directions), it is possible to form a free space directly beneath the panel 1 (or beneath an interface device, if present, see below). The free space is neither swept by light beams, nor populated by scanners/sensors 22, 38. In the embodiment of FIG. 6, a transverse girder 50 extends in this free space to support the panel 1. The support is thus provided without having to increase the thickness of the FTIR system (as seen in a side view, cf. FIG. 1B). The support may serve to reduce stress and tension in the panel 1 and to increase the torsional stiffness of the FTIR system as a whole. The girder 50 may also be used as a guide for power cables and control cables to the scanners/sensors 22, 38 at the center of the panel 1. The space/girder may also be utilized to enhance heat dissipation from a display arranged beneath the panel 1, so as to reduce or even eliminate the need for mechanical cooling. For example, it may be desirable to avoid using forced air flows for cooling in the illumination and detection arrangements, e.g. to avoid spreading and deposition of dust and other particles on the optical components.

Figure 7A:
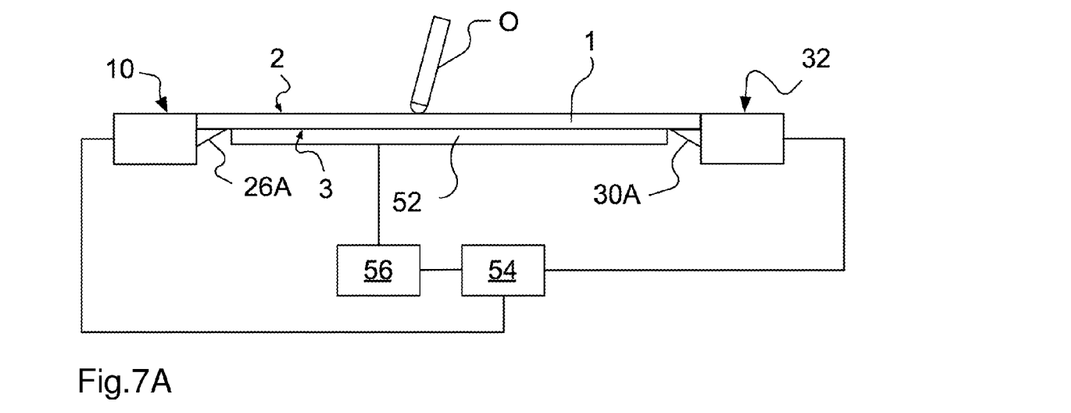
FIG. 7A is a section view an FTIR system.

FIG. 7A is a section view of an embodiment of a complete FTIR system. The system includes a panel 1, an illumination arrangement 10 including a set of segment generators 20, a detection arrangement 32, and incoupling and outcoupling elements 26A, 30A. The system also includes an interface device 52 for providing a graphical user interface (GUI) within at least part of the touch surface 2. The interface device 52 may be in the form of a substrate with a fixed image that is arranged over, under or within the panel 1. Alternatively, as illustrated, the interface device 52 may be a display/screen arranged underneath the panel 1. Such an interface device 52 may provide a dynamic GUI, similar to the GUI provided by a computer screen. In further variants, the dynamic GUI may be provided by a projector arranged underneath or above panel to project an image onto the panel 1.

A data processor 54 is included in the system to control the operation of the illumination and detection arrangements 10, 32, and to retrieve and process output signals from the detection arrangement 32 for determination of touch data for interactions on the touch surface 2. The system also includes a GUI controller 56 that determines where graphical objects of the GUI shall be located, for example by using coordinates corresponding to the coordinates of the interactions on the touch surface 2 (represented by object O). The GUI controller 56 may be connected to the data processor 54 to obtain these coordinates and other touch data. In a variant, the data processor 54 and the GUI controller 56 are implemented by a single processing unit. The data processor 54 and the GUI controller 56 may thus be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit serves as one element/means when executing one instruction, but serves as another element/means when executing another instruction. In addition, one element/means may be implemented by one instruction in some cases, but by a plurality of instructions in some other cases. Such a software controlled computing device may include one or more processing units, e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The data processor/GUI controller may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software, and the adjustment factors, may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processor/GUI controller 54, 56 may include one or more communication interfaces, such as a serial interface, a parallel interface, a USB interface, a wireless interface, a network adapter, etc, as well as one or more data acquisition devices, such as an A/D converter. The special-purpose software may be provided to the data processor/GUI controller 54, 56 on any suitable computer-readable medium, including a record medium, or a read-only memory.

Figure 7B:
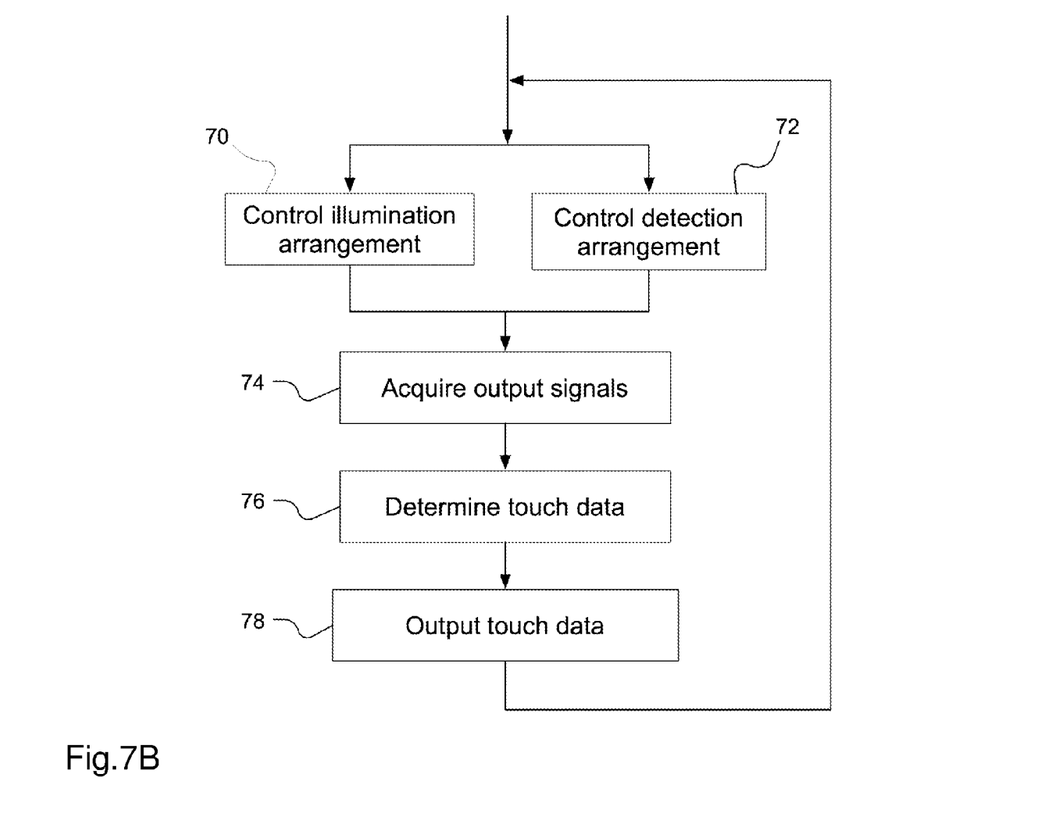
FIG. 7B is a flow chart of a control method executed by a data processor in the system of FIG. 7A.

FIG. 7B is flow chart of an embodiment of a control method performed by the data processor 54. The method repeatedly executes a series of steps. In step 70, the illumination arrangement 10 is operated to propagate light by internal reflection between the touch surface 2 and the opposite surface 3 of the panel 1, from the incoupling site(s) 26 on the panel to the outcoupling site(s) 30 on the panel 1. This process involves controlling a set of separate segment generators 20 to collectively generate at least one full beam sweep across the touch surface 2 (or part thereof), by sweeping one or more sets of individual beams of light along associated subsets of the incoupling site(s) 26. In step 72, which typically is executed concurrently with step 70, the detection arrangement 32 is operated to detect light reaching the outcoupling site 30. Step 72 results in one or more output signals of the detection arrangement 32, which are acquired by the data processor 54 in the subsequent (or concurrent) step 74. The data processor 54 then, in step 76, processes the output signal for determining touch data that represents the interaction on the touch surface 2. The touch data may represent the location, shape or size of the interactions on the touch surface 2, or combinations thereof. Step 76 may involve any suitable touch determination technique, such as disclosed in US2004/0252091, WO2009/077962, WO2010/006882, WO2010/006883, WO2010/006884, WO2010/006885, WO2010/006886, WO2011/049511, WO2011/049513, and WO2011/139213, which are all incorporated herein by reference. In step 78, the touch data is output by the process, e.g. for use by another process in the data processor 54, or a process in the GUI controller 56. Following step 78, the process returns to execute a new series of steps.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

For example, the FTIR system is not limited to the above-described beam arrangements, and the main directions of different legs need not be maintained essentially invariant within the touch surface. Furthermore, it is conceivable that the illumination arrangement combines the inventive generation of leg segments with conventional techniques for generating illuminating light.

The invention claimed is:

1. A touch-sensitive apparatus, comprising:
   a light transmissive panel that defines a touch surface and an opposite surface;
   an illumination arrangement for propagating light by internal reflection between the touch surface and the opposite surface from an elongated incoupling site on the panel to an elongated outcoupling site on the panel; and
   a detection arrangement for detecting light reaching the elongated outcoupling site;
   wherein the illumination arrangement is configured to sweep each individual beam of light in a first set of individual beams of light along a spatially different portion of the elongated incoupling site to generate a full beam sweep along the elongated incoupling site.

2. The touch-sensitive apparatus of claim 1, wherein the different portions collectively cover a relevant portion of the elongated incoupling site.

3. The touch-sensitive apparatus of claim 2, wherein the different portions are essentially non-overlapping.

4. The touch-sensitive apparatus of claim 1, wherein each individual beam in the first set of individual beams forms a first beam leg inside the panel which originates from and is translated along one of the different portions.

5. The touch-sensitive apparatus of claim 4, wherein each first beam leg has an essentially invariant main direction in the plane of the touch surface while being translated.

6. The touch-sensitive apparatus of claim 5, wherein the first beam legs that are formed by the first set of individual beams have essentially the same main direction in the plane of the touch surface.

7. The touch-sensitive apparatus of claim 6, wherein the illumination arrangement is further configured to sweep a second set of individual beams of light along different portions of the elongated incoupling site to generate a full beam sweep along the elongated incoupling site, wherein each individual beam in the second set of individual beams forms a second beam leg inside the panel which originates from and is translated along one of the different portions, wherein each second beam leg has an essentially invariant main direction in the plane of the touch surface while being translated, and wherein the first beam legs and the second beam legs have different main directions in the plane of the touch surface.

8. The touch-sensitive apparatus of claim 1, wherein the illumination arrangement comprises:
a set of leg generation systems, each leg generation system being configured to generate and sweep one of the individual beams of the first set of individual beams along one of the different portions of the elongated incoupling site.

9. The touch-sensitive apparatus of claim 8, wherein each leg generation system comprises:
at least one scanner module configured to sweep an input beam around an axis of rotation; and
an elongate optical device configured to receive and optically re-direct the input beam so as to form the individual beam.

10. The touch-sensitive apparatus of claim 9, wherein the set of leg generation systems have elongate optical devices with identical optical characteristics.

11. The touch-sensitive apparatus of claim 9, wherein the elongate optical device has a refractive power along its length.

12. The touch-sensitive apparatus of claim 9, wherein the elongate optical device is one of a Fresnel lens and a diffractive optical element.

13. The touch-sensitive apparatus of claim 9, wherein the at least one scanner module comprises:
a light source and at least one MEMS scanner.

14. The touch-sensitive apparatus of claim 9, wherein each leg generation system further comprises:
an elongate grating structure arranged to generate the individual beam as part of a set of diffracted beams with angular spacing.

15. The touch-sensing apparatus of claim 8, wherein the leg generation systems are at least partly arranged beneath the panel with respect to the touch surface.

16. The touch-sensing apparatus of claim 8, wherein the leg generation systems are arranged outside the perimeter of the touch surface.

17. The touch-sensing apparatus of claim 1, wherein the detection arrangement comprises:
an elongate light-sensing surface or an array of light sensing elements which is arranged parallel to and optically faces the elongated outcoupling site.

18. The touch-sensing apparatus of claim 1, wherein the detection arrangement comprises:
a set of leg detection systems, wherein each leg detection system is configured to receive one of the individual beams, wherein the leg detection system includes an elongate re-directing device which is arranged parallel to and optically faces the outcoupling elongated site and which is configured to receive and re-direct the individual beam onto a common detection region while the individual beam is swept along the elongated incoupling site, and a light sensor which is located at said common detection region to measure the energy of the individual beam.

19. A method of operating a touch-sensitive apparatus, comprising:
controlling an illumination arrangement to propagate light by internal reflection between a touch surface and an opposite surface of a light transmissive panel, from an elongated incoupling site on the panel to an elongated outcoupling site on the panel; and
controlling a detection arrangement to detect light reaching the elongated outcoupling site;
wherein the illumination arrangement is controlled to sweep each individual beam of light in a first set of individual beams of light along a spatially different portion of the elongated incoupling site to generate a full beam sweep along the elongated incoupling site.

20. A tangible computer-readable storage medium comprising computer code which, when executed on a data-processing system, causes the data-processing system to carry out the method of claim 19.

* * * * *